United States Patent Office 3,177,253
Patented Apr. 6, 1965

3,177,253
DIPHENYLALKANE DERIVATIVES
Gustav Ehrhart, Bad Soden, Taunus, Ernst Lindner, Frankfurt am Main, and Heinrich Ott, Eppstein, Taunus, Germany, assignors to Farbwerke Hoechst Aktiengesellschaft vormals Meister Lucius & Brüning, Frankfurt am Main, Germany, a corporation of Germany
No Drawing. Filed Jan. 24, 1961, Ser. No. 84,503
5 Claims. (Cl. 260—570.5)

The present invention relates to diphenylalkane derivatives of the Formula I

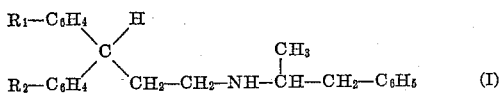

in which $R_1$ represents a hydrogen atom, a hydroxy or methoxy group, and $R_2$ represents a hydroxy or methoxy group, and their non-toxic acid addition salts.

The products of the present invention can be obtained by methods that may generally be used for the preparation of such diphenylalkane derivatives, i.e.

(a) By hydrogenating phenylacetone in the presence of amines of the Formula II

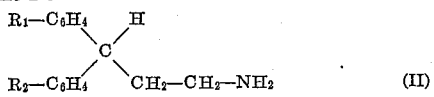

in which $R_1$ and $R_2$ have the meanings given above, or (b) By reacting an amine of the Formula II, preferably in the presence of an agent binding hydrogen halide, with 1-phenyl-2-halogeno-propanes or 1-phenyl-2-halogeno-propenes, and, in case the reaction is carried out with 1-phenyl-2-halogeno-propenes, hydrogenating the unsaturated compounds obtained of the Formula III

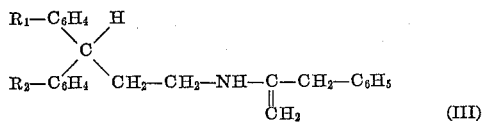

and of the Formula IV

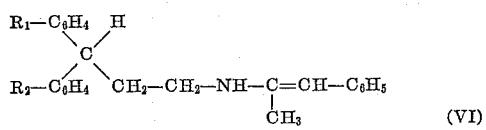

in which formulae $R_1$ and $R_2$ have the meanings given above, or (c) By hydrogenating, in the presence of 1-phenyl-2-amino-propane an aldehyde of the Formula V

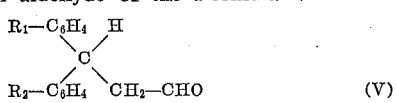

in which $R_1$ and $R_2$ have the meanings given above, or (d) By hydrogenating an unsaturated compound of the Formula VI

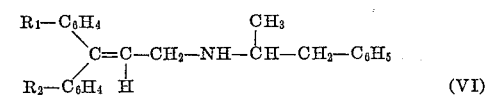

in which $R_1$ and $R_2$ have the meanings given above, or (e) By reacting a suitably substituted diphenylmethane or diphenyl-acetonitrile, preferably in the presence of agents splitting off hydrogen halide, with halogeno-substituted amines of the Formula VII

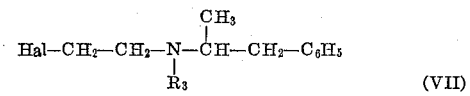

in which $R_3$ represents a hydrogen atom or the benzyl group and "Hal" stands for a halogen atom, preferably a chlorine atom, and, in case a substituted diphenyl-acetonitrile is used, substituting the hydrogen atom for the nitrile group of the reaction products obtained either by means of sodamide or by hydrolization of the nitrile group to form a carboxyl group and subsequent decarboxylation, and, in case $R_3$ represents a benzyl group, catalytically splitting off the benzyl group, or (f) By reducing a substituted $\beta,\beta$-diphenyl-propionic acid amide of the Formula VIII

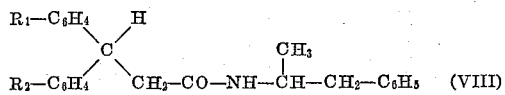

in which $R_1$ and $R_2$ have the meanings given above, to form the corresponding amine, or (g) By methylating the hydroxy groups in compounds of the Formula I in which $R_1$ and/or $R_2$ represent hydroxy groups, or (h) By demethylating the methoxy groups in compounds of the Formula I in which $R_1$ and/or $R_2$ represent methoxy groups.

For preparing the products of the present invention the reduction of phenylacetone in the presence of amines of the Formula II is of special advantage. As amines, there enter into consideration, for example:

1-(o-methoxy-phenyl)-1-phenyl-propylamine-(3),
1-(m-methoxy-phenyl)-1phenylpropylamine(3),
1-(p-methoxy-phenyl)-1-phenyl-propylamine-(3),
1-(o-hydroxy-phenyl)-1-phenyl-propylamine-(3),
1-(m-hydroxy-phenyl)-1-phenyl-proylamine-(3),
1-(p-hydroxy-phenyl)-1-phenyl-propylamine-(3),
1-(m-hydroxy-phenyl)-1-(p - hydroxy - phenyl) - propyl-amine-(3),
1,1-di-(o-, m- or p-methoxyphenyl)-propylamine-(3), and
1,1-di-(o-, m- or p-hydroxy-phenyl)-propylamine-(3).

The above amines can be obtained, for example, by the method described in Liebig's Annalen der Chemie 603, page 192 (1957). The reduction of phenylacetone in the presence of amines of the Formula II is effected advantageously catalytically. As catalysts are suitable the metals of the 8th group of the Periodic System, preferably nickel catalysts, in the presence of solvents conventionally used therefor, for example, water-miscible aliphatic alcohols. Noble metals such as palladium or platinum or Raney catalysts may also be used. The reduction may also be effected by means of nascent hydrogen, for example, by means of aluminium amalgam and alcohol, sodium amalgam, lithium-aluminium hydride or sodium-boron hydride.

According to another method of preparing the compounds of the present invention, the above-mentioned amines of the Formula II may also be reacted with 1-phenyl-2-halogeno-propanes or 1-phenyl - 2 - halogeno-propenes, chlorine, bromine or iodine atoms entering into consideration as halogen atoms. The reaction is carried out advantageously by heating the reactants for a prolonged period in an appropriate solvent. As such are suitable, for example, alcohols, benzene, toluene, ether or chloroform. In order to bind the hydrogen halide set free during the reaction it is advantageous to use the amine in bimolar excess. The hydrogen halide may also be bound by means of other basic compounds, for example, by means of alkali metal- or alkaline earth metal-carbonates or hydroxides, as well as by means of organic bases such as pyridine or quinoline which may also be used simultaneously as solvents. The reaction mixtures so obtained are worked up in the usual manner by separation of the hydrohalic salt of the base used, for example, by precipitation with ether or by extraction by shaking with water.

The products so obtained can be purified by distillation. In case amines of the Formula II are reacted with 1-phenyl-2-halogeno-propenes, there are obtained corresponding unsaturated compounds. In this case the double bond present is subsequently hydrogenated in usual manner. The hydrogenation can be effected, for example catalytically with the aid of metal catalysts of the 8th group of the Periodic System such as platinum or palladium. Raney catalysts may also be used. The hydrogenation is advantageously effected in the presence of suitable solvents. As such there enter into consideration, for example: low molecular, aliphatic alcohols, glacial acetic acid, ethyl acetate. The double bond may also be saturated in the presence of sodium or aluminium amalgam; this saturation is effected in a suitable solvent, for example, in ethanol or in diethyl ether by adding portionwise sodium amalgam to the compound to be hydrogenated, and subsequent boiling of the reaction mixture under reflux. In case aluminium amalgam is to be used, an excess quantity of aluminium amalgam together with the calculated quantity of water to yield the required quantity of hydrogen is added to the compound to be hydrogenated, and the reaction mixture is heated under reflux for several hours. Working up is effected in the usual manner. In case the hydrogenation is effected catalytically, the catalyst is removed by filtration and the filtrate is concentrated by distillation; the products of the invention are isolated from the residue by distillation or by crystallization. In case the hydrogenation is carried out with the aid of amalgams, it is preferred to remove the inorganic reactants and to separate off the products of the invention in the manner described above.

A further method of carrying out the process of the present invention comprises hydrogenating an aldehyde of the Formula V in the presence of 1-phenyl-2-amino-propane. As aldehyde there enters into consideration, for example, β-(o-, m- or p-methoxy-phenyl)-β-phenyl-propionaldehyde or β,β-di-(o-, m- or p-methyl-phenyl)-propionaldehyde. The reaction can be carried out in the manner described above.

A further method of preparing the products of the present invention consists in hydrogenating the corresponding alkene-derivatives of the Formula VI which themselves are obtainable by methods as such known. As starting substances there are mentioned by way of example: 2'-[1-(o-, m- or p-methoxy)-1-phenyl-propene-(1)-yl-(3)]-amino-3'-phenyl-propane and 2'-[1,1-di-(o-, m- or p-methoxyphenyl)-propene-(1)-yl-(3)-amino]-3'-phenyl-propane.

Compounds which contain a hydroxy group instead of a methoxy group as substituent in the phenyl nucleus are equally well suitable as starting substances.

The hydrogenation can be effected in accordance with the method described above.

Another possibility of preparing the compounds of the present invention comprises reacting a diphenylacetonitrile or diphenylmethane, if desired substituted in the way as indicated, with halogeno-substituted amines of the Formula VII.

As such a halogeno-substituted amine there may be used, for example, 1-phenyl-2-[N-1'-chloroethyl-(2')-N-benzyl]-amino-propane.

On principle, the reaction can be effected according to the method described in "Liebig's Annalen der Chemie" 561 (1948), page 52. The reaction is advantageously carried out in inert organic solvents such, for example, as benzene, toluene, or xylene. As agents binding hydrohalic acid, there are mentioned by way of example: sodamide, sodium phenyl, lithium phenyl, or sodium metal. It is advantageous to dissolve or to suspend two of the three reactants required in benzene or in a similar solvent and then to add portionwise the third reactant. After the addition is terminated, the reaction mixture is advantageously boiled under reflux for some time, and, after having added water, it is worked up in the usual manner, for example, by extraction of the basic components of the reaction mixture from the organic solvent by means of dilute acids. If a substituted diphenylmethane is used as starting material, sodium phenyl is used with special advantage as an agent binding hydrohalic acid. If a substituted diphenyl-acetonitrile is used as starting susbtance, the nitrile group present in the reaction product is exchanged for a hydrogen atom, for example, according to the method described in "Liebig's Annalen der Chemie" 561 (1948), page 52, by prolonged heating with sodamide in benzene or toluene. The nitrile group can also be hydrolized by means of strong acids, for example, sulfuric acid of 70% strength, to form a carboxyl group and this group can then be decarboxylated by heating. Any benzyl group which might be present at the nitrogen atom can be separated off in the usual manner, for example, by catalytical hydrogenation in the presence of a noble metal catalyst.

A further method of preparing the diphenylalkane derivatives of the present invention consists in reducing substituted, β,β-diphenyl-propionic acid amides of the Formula VIII

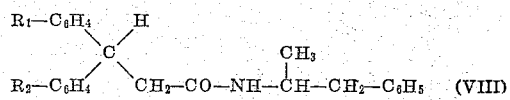

in which $R_1$ and $R_2$ have the indicated meanings, to form the corresponding amines, the reduction by means of lithium-aluminium hydride being particularly advantageous. The substituted β,β-diphenyl-propionic acid amides required as starting materials are obtainable, for example, by reaction of 1-phenyl-2-amino propane with acid chloride, if desired substituted in the way as indicated, of the formula

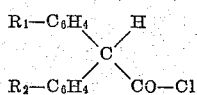

The acids on which the acid chlorides are based can be prepared by the method described in J. Chem. Soc. (London), 117, page 1596.

The reduction of the substituted β,β-diphenyl-propionic acid amides by means of lithium-aluminium hydride is advantageously carried out in the presence of an inert organic solvent, for example, diethyl ether, dioxane, or tetrahydrofurane. The propionic acid amide is advantageously added portionwise to a suspension of lithium-aluminium hydride in one of the mentioned solvents, the reaction mixture is then allowed to boil for some time under reflux and is then worked up in the usual manner by decomposition with water and separation into the inorganic and organic components.

The products of the Formula I in which $R_1$ and/or $R_2$ stand for methoxy groups can also be prepared by methylation of the compounds that contain hydroxy groups in a corresponding position. Thus, the hydroxy compounds are reacted, for example, with dimethyl sulfate, methyl iodide or other alkylating agents, if necessary in the presence of bases such as alkali metal hydroxides or alkaline earth metal hydroxides. Generally, the reaction with dimethyl sulfate already starts at room temperature; the methylation by means of methyl halides can be carried out by heating, if necessary in a closed vessel under elevated pressure.

The products of the Formula I in which $R_1$ and/or $R_2$ stand for hydroxy groups can also be prepared by demethylation in usual manner of compounds corresponding to the Formula I in which $R_1$ and/or $R_2$ stand for methoxy groups. The demethylation can be carried out, for example, by heating with hydrogen bromide, aluminium chloride or pyridine hydrochloride.

The products of the present invention can be converted into the corresponding salts by treatment with inorganic or organic acids. As inorganic acids there enter into consideration, for example: hydrohalic acids such as hydrogen chloride and hydrogen bromide, sulfuric acid, phosphoric acid and aminosulfonic acid. As organic acids, there are mentioned by way of example: formic acid, acetic acid, propionic acid, lactic acid, maleic acid, succinic acid, tartaric acid, benzoic acid, salicylic acid, citric acid, aceturic acid, glycolic acid, gluconic acid, hydroxy-ethane-sulfonic acid, and ethylene-diamine-tetra-acetic acid.

The products of the present invention are valuable medicaments which are distinguished by an excellent activity on cardiac and general blood vascular circulation. For example, a single injection of 10–20 mcg. of 1-phenyl - 2 - [3' - (m-methoxy-phenyl)-3'-(p-methoxy-phenyl)-propyl-(1')]-amino-propane or 1 - phenyl-2-[3'-(m-methoxy-phenyl) - 3 - phenyl-propyl - (1')]-amino-propane into a rabbit's heart isolated by the method of Langendorff provoked a strong dilatation of the coronary vessels which reached a maximum with an injection of 30 mcg. Permanent infusion of 1.2 mcg. per minute also caused a considerable increase of the coronary blood flow which reached a maximum with an infusion of 2 mcg. per minute. Even if the infusion was discontinued the increased blood flow was still maintained for a considerable time. The products of the present invention already cause the dilatation of the coronary and peripherial vessels in such small doses that the toxicity is practically negligible (for 1 - phenyl - 2[3'-(m-methoxy-phenyl)-3'-(p-methoxy-phenyl)-propyl - (1') - amino-propane the Dos. Leth. min. is 15–20 mg./kg.).

In a guinea pig's heart isolated by the method of Langendorff, the compounds 1-phenyl-2-[3'-(m-hydroxy-phenyl) - 3' - phenyl-propyl-(1')]-amino-propane or 1-phenyl-2-[3'-(m-hydroxy-phenyl)-3'-(p-hydroxy-phenyl)-propyl-(1')]-amino-propane, when administered in a dose of 20–40 mcg., provoked an increase of the coronary blood flow by 70–80% of the original value.

The compounds of the present invention may be applied as such or in form of their corresponding salts, or if required, in admixture with pharmaceutically suitable carrier substances, either parenterally or orally. For oral administration, the preparations may be used preferably in the form of tablets or dragees which also contain the usual carriers such as lactose, starch, tragacanth, or magnesium stearate, as well as the said compounds as active ingredient.

The following examples illustrate the invention but they are not intended to limit it thereto:

EXAMPLE 1

*1-phenyl-2-[3'-(m-methoxy-phenyl)-3'-phenyl-propyl (1')]-amino-propane*

24 g. of 1-(m-methoxy-phenyl) - 1 - phenyl - 3 - amino-propane were hydrogenated at 60–65° C. with a solution of 14 g. of phenyl-acetone in 250 cc. of isopropanol in the presence of palladium catalyst. After the calculated quantity of hydrogen had been taken up and the catalyst had been removed by filtration, the filtrate was concentrated and the oily residue was converted into the crystalline hydrochloride by the addition of hydrochloric acid. 27.5 g. of 1-phenyl-2-[3'-(m-methoxy-phenyl) - 3' - phenyl-propyl-(1')]-amino-propane hydrochloride were obtained. The substance was found to melt at 171–173° C.

The 1-(m-methoxy-phenyl)-1-phenyl-3-amino-propane used as starting substance can be prepared as follows: 167 g. of α-cyano-β-(m-methoxy-phenyl)-acrylic acid methyl ester, prepared by condensation of the methyl ester of cyanoacetic acid with m-methoxy-benzaldehyde, are reacted with magnesium-phenyl bromide. The ester group is subjected to alkaline hydrolysis and the carboxylic acid formed is decarboxylated in the usual manner. There are thus obtained 142 g. of β-(m-methoxy-phenyl)-β-phenyl-propionitrile which has a boiling point of 173–175° C. (0.6 mm. of mercury). By hydrogenating the nitrile group in presence of Raney nickel, there are obtained 110 g. of 1-(m-methoxy-phenyl)-1-phenyl-3-amino-propane which has a boiling point of 149–150° C. under a pressure of 0.4 mm. of mercury.

EXAMPLE 2

*1-phenyl-2-[3'-(m-methoxy-phenyl)-3'-(p-methoxy-phenyl)-propyl-(1')]-amino-propane*

By hydrogenating 27.1 g. of 1-(m-methoxy-phenyl)-1-(p-methoxy-phenyl)-3-amino-propane (B.P.=167°–168° C. under a pressure of 0.2 mm. of mercury) with 14 g. of phenylacetone according to the method described in Example 1, there were obtained 27 g. of 1-phenyl-2-[3'-(m-methoxy-phenyl) - 3' - (p-methoxy-phenyl)-propyl-(1')]-amino-propane hydrochloride. The substance was found to melt at 190–192° C.

The starting substance can be prepared by the method described in Example 1. The β-(m-methoxy-phenyl)-β-(p-methoxy-phenyl)-propionitrile has a boiling point of 203–205° C. under a pressure of 0.6 mm. of mercury.

EXAMPLE 3

*1-phenyl-2-[3'-(m-methoxy-phenyl)-3'-phenyl-propyl (1')]-amino-propane*

24 g. of 1-(m-methoxy-phenyl)-1-phenyl-3-amino-propane together with 7.8 g. of 1-phenyl-2-chloro-propane were heated for 3–4 hours on the oil bath at a temperature of 150–160° C. After having been allowed to cool, the reaction mixture was treated with dilute hydrochloric acid. There was obtained the 1-phenyl-2-[3'-(m-methoxy-phenyl) - 3' - phenyl-propyl-(1')]-amino-propane hydrochloride which was found to melt at 170–172° C.

EXAMPLE 4

*1-phenyl-2-[3'-(m-methoxy-phenyl)-3'-phenyl-propyl-(1')]-amino-propane*

28 g. of 1-phenyl-2-[3'-(m-methoxy-phenyl)-3'-phenyl-propene-(3')-yl-(1')]-amino-propane (prepared by dehydration of 1-phenyl-2-[3'-(m-methoxy-phenyl)-3'-phenyl-3'-hydroxy-propyl-(1')]amino-propane by means of p-toluenesulfonic acid) were hydrogenated in the presence of a palladium catalyst and ethanol as solvent. After the reaction was terminated, the reaction mixture was filtered, concentrated, and the oily residue was converted into the 1-phenyl-2-[3'-(m-methoxy-phenyl)-3'-phenyl-propyl-(1')-amino]-propane hydrochloride (B.P.=171–172° C.) by the addition of dilute hydrochloric acid. The yield was 24 g.

Instead of the palladium catalyst, a Raney nickel catalyst may also be used for the hydrogenation.

EXAMPLE 5

(a) *1-phenyl-2-[3'-(m-methoxy-phenyl)-3'-phenyl-propyl-(1')]-amino-propane*

4.2 g. of sodamide were introduced into a mixture of 22.5 g. of phenyl-(m-methoxy-phenyl)-acetonitrile (prepared according to the method described in "Liebig's Annalen der Chemie" 561 (1948), page 52) and 30 g. of 2-(N-chloroethyl-N-benzylamino)-3-phenyl-propane in 150 ml. of benzene. The reaction mixture was heated under reflux for 2 hours. After having been allowed to cool, the reaction mixture was decomposed with water and the benzene layer was separated off. The benzene was evaporated to the utmost possible extent, and upon addition of dilute hydrochloric acid to the residue, there was obtained at first the oily 1-phenyl-2-[N-3'-phenyl-3'-(m-methoxy-phenyl) - 3' - cyano-propyl-(1')-N-benzyl]-amino-propane hydrochloride. 27 g. of the free base obtained from the hydrochloride were then dissolved in 150 ml. of benzene and, after addition of 25 g. of sodamide, the solution was boiled under reflux for 2 hours. The reaction mixture was then filtered with suction to remove the excess of sodamide and the benzene was removed by distillation under reduced pressure. The residue was purified via the hydrochloride. 13 g. of the compound 1 - phenyl - 2 - [N - 3' - phenyl-3'-(m-methoxy-phenyl)- propyl-(1')-N-benzyl]amino-propane thus obtained were then hydrogenated in 100 ml. of isopropanol in the presence of a palladium catalyst. After the calculated quantity of hydrogen had been taken up, the reaction mixture was filtered, the filtrate was concentrated. By addition of dilute hydrochloric acid to the oil that remained behind, there were obtained 11 g. of crystalline 1-phenyl-2-[3' - (m-methoxy-phenyl)-3'-phenyl-propyl-(1')]-amino-propane hydrochloride which was found to melt at 170–172° C.

(b) *1-phenyl-2-[3'-(m-methoxy-phenyl)-3'-phenyl-propyl-(1')]-amino-propane*

23.5 g. of chlorobenzene and 36.4 g. of 3-benzylanisol were added dropwise, while stirring mechanically, to a suspension of 10.1 g. of sodium metal in 50 ml. of benzene. As soon as the time was reached at which the temperature did no more rise, 60 g. of 2-(N-chloroethyl-N-benzyl-amino)-3-phenyl-propane (prepared according to the method described in U.S. Patent 2,597,247) were added dropwise at 30–40° C. After one hour's boiling under reflux, water was cautiously added to the reaction mixture. After having separated off and dried the benzene layer, the solvent was eliminated by distillation; the oily residue (74 g.) was purified via the hydrochloride and the N-benzyl group of the base obtained was split off by catalytical hydrogenation at 60–70° C. with the use of a palladium catalyst. After filtration, concentration, and recrystallization, there were obtained 55 g. of 1-phenyl-2-[3'-(m-methoxy-phenyl)-3'-phenyl-propyl-(1')] - amino-propane hydrochloride. The substance was found to melt at 171–173° C.

EXAMPLE 6

*1-phenyl-2-[3'-(m-methoxy-phenyl)-3'-phenyl-propyl-(1')]-amino-propane*

15 g. of dimethyl sulfate were added, at 40–45° C. while stirring mechanically, to 34.5 g. of 1-phenyl-2-[1'-(m-hydroxy-phenyl) - 1' - phenyl-propyl - (3') - amino]-propane in an excess quantity of 2 N-sodium hydroxide solution. After having shaken out the alkaline solution with ether, the ether solution was dried and concentrated. The oily residue (25 g.) was converted as described in Example 5 into the 1-phenyl-2-[3'-(m-methoxy-phenyl)-3' - phenyl-propyl - (1')] - amino-propane hydrochloride which was found to melt at 170–172° C. The yield was 26 g.

EXAMPLE 7

*1-phenyl-2-[3'-(m-hydroxy-phenyl)-3'-phenyl-propyl-(1')]-amino-propane*

5 g. of 1-phenyl-2-[3'-(m-methoxy-phenyl)-3'-phenyl-propyl-(1')]-aminopropane hydrochloride together with 20 g. of pyridine hydrobromide were heated for 5 minutes to 210° C., whereby a clear melt formed. After having allowed it to cool, an excess quantity of a dilute sodium carbonate solution was added and the mixture was extracted with ether. After drying and removal of the ether by distillation, the residue was converted by the addition of dilute hydrochloric acid into the 1-phenyl-2-[3' - (m-hydroxy-phenyl)-3'-phenyl-propyl-(1')]-amino-propane hydrochloride. After recrystallization from a mixture of ethanol/ether, the compound was found to melt at 178–180° C. The yield was 3 g.

EXAMPLE 8

*1-phenyl-2-[3'-(m-hydroxy-phenyl)-3'-(p-hydroxy-phenyl)-propyl-(1')]-amino-propane*

5 g. of 1-phenyl-2-[3'-(m-methoxy-phenyl)-3'-(p-methoxy-phenyl)-propyl-(1')]-amino-propane hydrochloride and 40 g. of pyridine hydrochloride were converted by the method described in Example 7 into the 1-phenyl-2-[3' - (m - hydroxy-phenyl)-3'-(p-hydroxy-phenyl)-propyl-(1')]-amino-propane hydrochloride which was found to melt at 196–198° C. (from ethanol/ether). The yield was 2.4 g.

EXAMPLE 9

*1-phenyl-2-[3'-phenyl-3'-(m-methoxy-phenyl)-propyl-(1')]-amino-propane*

6 g. of β-phenyl-β-[(m-methoxy-phenyl)-propionic acid-N-(1-phenyl-propyl-(2)]-amide (prepared by the reaction of 1-phenyl-2-amino-propane with β-phenyl-β-(m-methoxy-phenyl)-propionic acid chloride) were added to a suspension of 6 g. of lithium-aluminium hydride in 500 cc. of absolute ether, and the reaction mixture was boiled under reflux for 10 hours. After having been allowed to cool, the mixture was decomposed by cautious addition of moist diethylether and water, and the organic phase was separated off. The organic phase was dried and the solvent removed by distillation. There were obtained 3.6 g. of 1-phenyl-2-[3'-phenyl-3'-(m-methoxy-phenyl)-propyl-(1')]-amino-propane in the form of an oil. The corresponding hydrochloride was found to melt at 171–173° C.

We claim:

1. A member selected from the group consisting of diphenylalkane derivatives of the Formula I

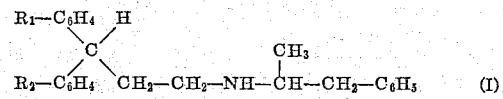

in which $R_1$ is a member selected from the group consisting of hydrogen, hydroxy and methoxy, and $R_2$ is a member selected from the group consisting of hydroxy and methoxy, and the salts of physiologically compatible acids of these compounds.

2. 1 - phenyl - 2 - [3' - (m - methoxy - phenyl) - 3'-(p-methoxy-phenyl)-propyl-(1')]-amino-propane.

3. 1 - phenyl - 2 - [3' - (m - methoxy - phenyl) - 3'-phenyl-propyl-(1')]-amino-propane.

4. 1 - phenyl - 2 - [3' - (m - hydroxy - phenyl) - 3'-phenyl-propyl-(1')]-amino-propane.

5. 1 - phenyl - 2 - [3' - (m - hydroxy - phenyl) - 3'-(p-hydroxy-phenyl)-propyl-(1')]-amino-propane.

References Cited in the file of this patent

UNITED STATES PATENTS 2,738,347    Bernstein et al. _____ Mar. 13, 1956

FOREIGN PATENTS 130,552    Australia _____ Dec. 8, 1948
1,058,063    Germany _____ May 27, 1959